July 24, 1956 L. E. BROBERG 2,755,942
DRIVE SYSTEM FOR ROTARY CUTTER ARM
Filed Oct. 17, 1952 2 Sheets-Sheet 1

INVENTOR.
Leonard E. Broberg
BY
*Andrus & Seeales*
ATTORNEYS.

July 24, 1956
L. E. BROBERG
2,755,942
DRIVE SYSTEM FOR ROTARY CUTTER ARM
Filed Oct. 17, 1952
2 Sheets-Sheet 2
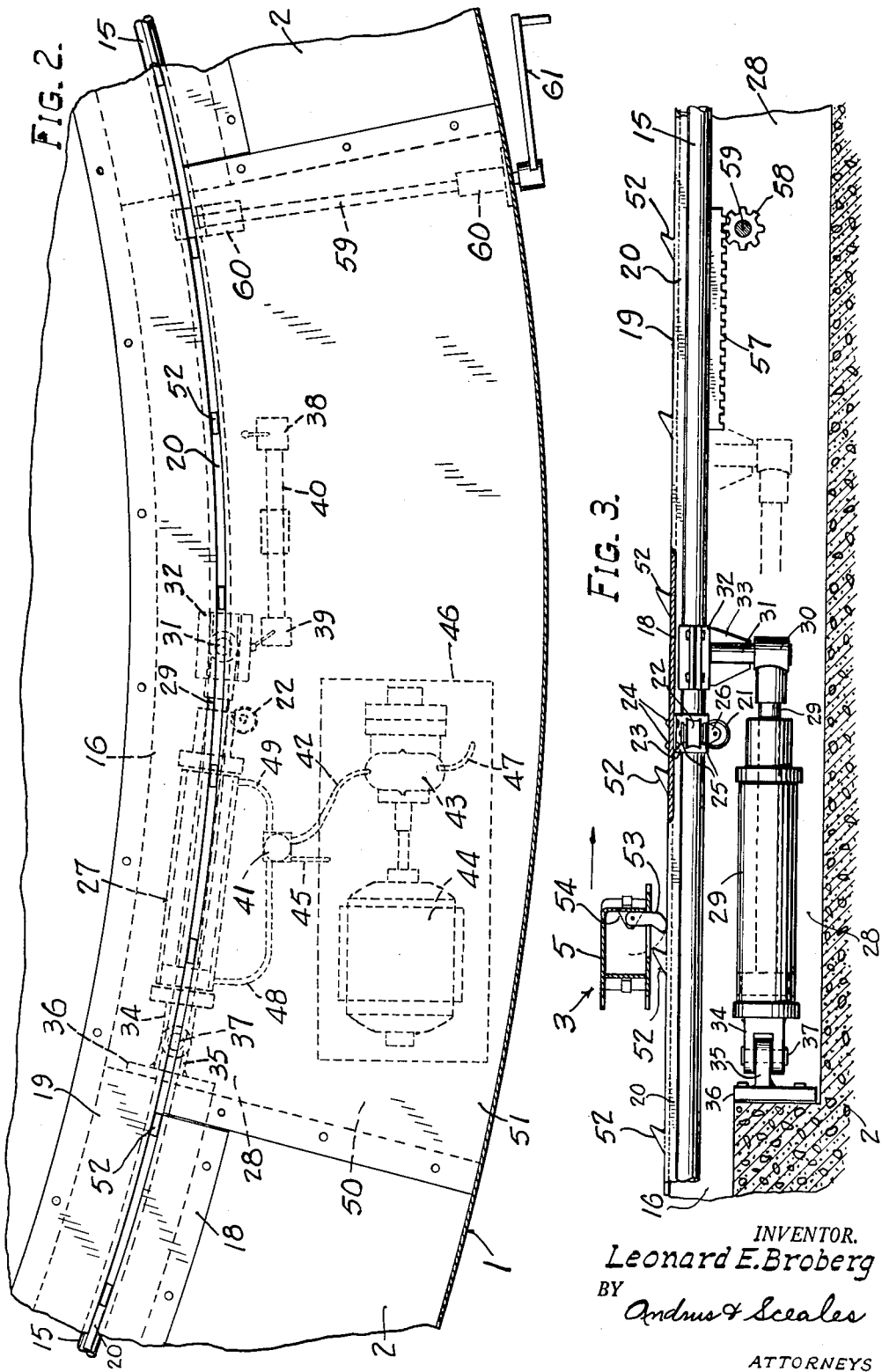
INVENTOR.
Leonard E. Broberg
BY
Andrus & Scales
ATTORNEYS 2,755,942
Patented July 24, 1956

2,755,942
DRIVE SYSTEM FOR ROTARY CUTTER ARM

Leonard E. Broberg, Milwaukee, Wis., assignor to A. O. Smith Corporation, Milwaukee, Wis., a corporation of New York Application October 17, 1952, Serial No. 315,253

6 Claims. (Cl. 214—17)

This invention relates to a drive system for a rotary cutter arm employed to undercut stored material in a storage structure and more particularly to a system designed to drive a relatively long cutter arm from the outer extremity thereof.

Storage structures, such as silos, are often equipped with an automatic unloading device which undercuts the silage or other stored material and conveys the same to the exterior of the silo. The cutting mechanism frequently comprises a rotating sweep cutter arm which is pivoted and driven from the center of the silo and is adapted to sweep around the interior of the silo and undercut the silage.

However, in the large diameter silos a comparatively long length arm is required and numerous difficulties arise in driving such a long cutter arm from the center of the silo. In particular, a center drive shaft of considerable size is required to drive a long arm and a considerable torque is produced at the center shaft which is difficult to effectively cushion.

It is, therefore, an object of the present invention to provide a drive system for rotating a sweep cutter arm whereby the arm is merely pivoted at the center of the silo and driven at the outer extremity thereof.

Another object of the invention is to provide a drive system for a sweep cutter arm which eliminates the torque at the center post and thereby reduces the required size of the post.

Still another object is to provide a drive system for a rotary cutter arm which is driven by hydraulic pressure and enables the arm to drive through even the hardest packed silage with a uniform movement.

Another object is to provide a drive system which is of simple construction and appreciably reduces installation and maintenance costs.

The present invention is directed to a drive system for rotating a sweep cutter arm employed to undercut silage in a silo or storage vessel. The inner end of the cutter arm is mounted for rotational movement at the center of the silo and a circular pipe or track is disposed concentrically of and within the silo and in a plane beneath the cutter arm. The pipe is given oscillatory motion about its central vertical axis by a pair of hydraulic cylinders, and a plurality of upstanding hook members on the pipe are adapted to successively engage a latch on the outer portion of the cutter arm to drive the arm in a circular path as the pipe oscillates. As the arm is merely pivoted at the center of the silo and driven at the outer extremity, a much greater driving force can be attained without any appreciable torque developed at the center pivot post.

Other objects and advantages of the invention will appear in the course of the following description of the drawings.

In the drawings:

Fig. 2 is an enlarged fragmentary view of Figure 1 showing the power system;

Fig. 3 is a vertical section taken along line 3—3 of Fig. 2; and

Figure 1:
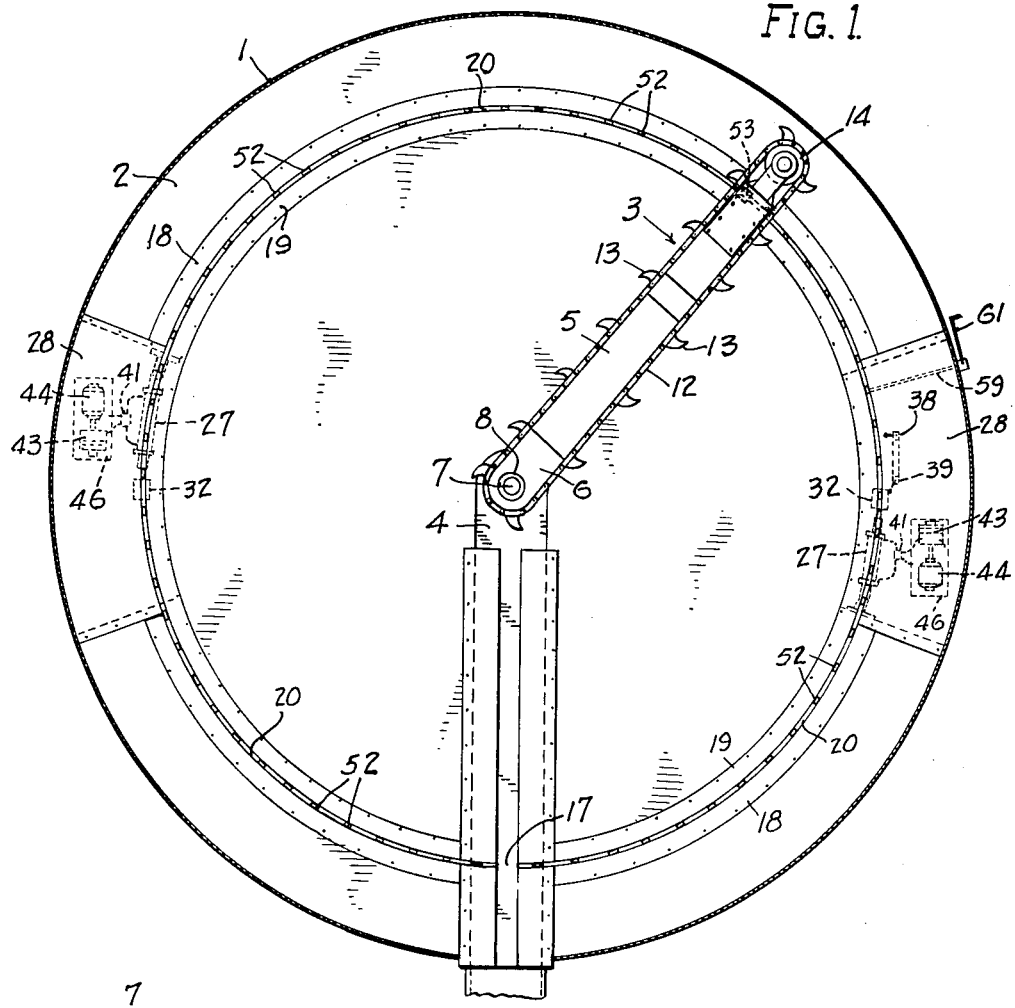
Figure 1 is a horizontal section taken through a silo incorporating the present invention.
Figure 4:
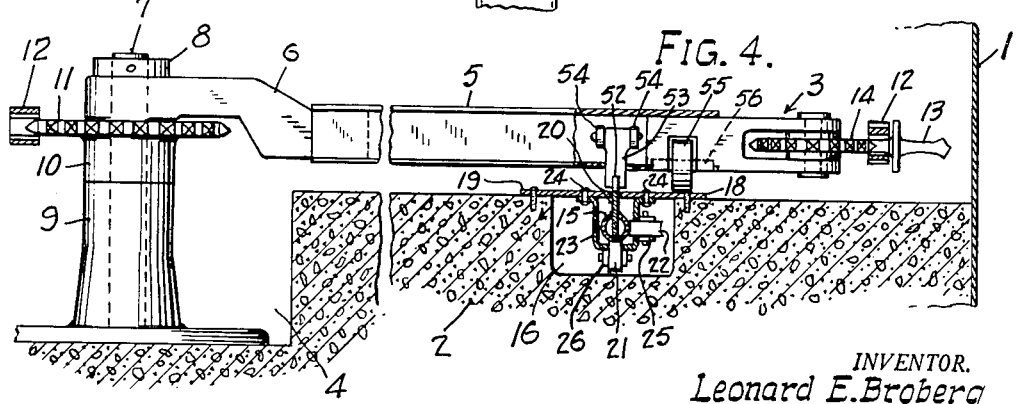
Fig. 4 is a vertical section taken along line 4—4 of Figure 1 showing the placement of the pipe within the silo foundation.

Referring to the drawings there is shown a generally cylindrical storage structure or silo 1 adapted to contain silage or the like and supported on a generally circular concrete foundation 2.

A sweep arm cutter 3, similar to that described in the co-pending application of Julius Tiedemann Serial No. 98,794, filed June 13, 1949 and now issued to Patent Number 2,635,770, and entitled Method of Unloading Stored Materials and Apparatus Therefor, is employed to rotate over foundation 2 adjacent the walls of silo 1 and undercut the silage.

The cut silage is swept into a radially extending trough 4 formed in the foundation 2. A suitable conveyor unit, not shown, is disposed within trough 4 and serves to convey the silage to the exterior of the silo.

The cutter arm 3 comprises a generally rectangular body portion 5 having an insert 6 attached to the inner end thereof by welding or the like. Insert 6 is mounted for rotation on vertical shaft 7 which is disposed centrally of silo 1. Insert 6 is retained on shaft 7 by collar 8.

The lower end of shaft 7 is secured within a pedestal 9 which is secured at the center of silo 1 to foundation 2 within trough 4. The central portion of shaft 7 carries a rotatable hub 10 and a driving sprocket 11 attached thereto. Hub 10 and sprocket 11 may be given rotary motion by any convenient means, not shown.

An endless cutter chain 12 having a plurality of cutter teeth 13 attached thereto at spaced intervals is carried on arm 3, by driving sprocket 11 and by an outer sprocket 14 which is rotatably secured between the bifurcated outer ends of body portion 5. Cutter chain 12 is driven by sprocket 11 and moves about sprockets 11 and 14 as the arm 3 pivots about shaft 7 with the teeth 13 digging into the silage and ripping through or undercutting the same.

The drive system utilized to rotate arm 3 about shaft 7 includes a generally circular pipe 15 which is disposed within and concentrically of silo 1. Pipe 15 is contained within a generally annular recess 16 in foundation 2, and positioned adjacent the outer circumference of the foundation a slight distance beneath the upper surface thereof. Annular recess 16 intersects the radially extending conveying trough 4.

Pipe 15 is substantially one continuous piece with the exception of a small gap 17 formed therein at a position aligned with the vertical center line of trough 4. Gap 17 is provided so as to enable the pedestal 9 for the center pivot shaft 7 to be withdrawn from the silo through trough 4.

To prevent silage from falling into recess 16 a pair of annular concentric closure plates 18 and 19 are secured by bolts or the like to the upper surface of foundation 2 and serve to substantially close off recess 16. Outer plate 18 extends inwardly partially overlying recess 16 while the inner plate 19 extends outwardly over the recess and is spaced from plate 18 so that an annular clearance is provided between the adjacent circular edges of plates 18 and 19. The clearance is aligned directly above pipe 15.

To prevent silage from falling within the annular clearance between plates 18 and 19, pipe 15 is provided with a vertical, generally circular fin 20 which extends upwardly from pipe 15 within the clearance. The upper edge of fin 20 is generally flush with the upper surfaces of plates 18 and 19 and the fin is spaced from the adjacent circular edges of the plates so that it may move freely within the clearance. The lower edge of fin 20 is secured within a suitable slot in pipe 15 by welding or the like.

Pipe 15 is supported for oscillatory movement within recess 16 by a plurality of circularly spaced vertical rollers 21 and horizontal rollers 22 which are disposed within recess 16 and carried by channel brackets 23.

Brackets 23 are disposed about pipe 15 with the open end of brackets 23 facing upwardly toward plates 18 and 19, and secured to the plates by a pair of bolts 24 which extend through suitable openings in the upper side flanges of brackets 23 and the respective plates 18 and 19.

Horizontal rollers 22 are mounted for rotation between lugs 25 which in turn are welded edgewise to the outer side surface of bracket 23. Rollers 22 extend through suitable openings in the side surface of brackets 23, between the position of attachment of lugs 25 thereto, and bear against the pipe 15.

Vertical rollers 21 are similarly mounted for rotation between vertical lugs 26 which are secured edgewise to the web portion of brackets 23. Vertical rollers 21 extend upwardly through suitable openings in the web of brackets 23 and bear against the bottom of the pipe 15.

Pipe 15 is given oscillatory movement by a pair of double acting hydraulic cylinders 27 which serve to alternately give pipe 15 incremental clockwise and counterclockwise rotation.

Cylinders 27 are disposed at diametrically opposite positions in relation to pipe 15 and are aligned below the pipe in depressions 28 which communicate with annular recess 16.

Each cylinder 27 carries a suitable piston rod 29 which is actuated reciprocally by hydraulic pressure within the respective cylinder 27.

The working end of piston rod 29 carries a bearing 30 which is pivotally connected to a vertically disposed wrist pin 31. The upper extremity of pin 31 is secured to the lower half of a pipe clamp 32 and the pipe is removably secured between the upper and lower halves of clamp 32 by bolts or the like. For added re-enforcement webs 33 are welded between pin 31 and the lower half of clamp 32.

As the pipe 15 is adapted to be moved in a circular path by piston rods 29 and the rods themselves move in a straight line path, the cylinders 27 must be pivoted to compensate for this variance in movement. This may be accomplished by securing a bifurcated bearing bracket 34 to the rear or non-working end of each cylinder. A lug 35 which projects outwardly from a vertical base plate 36 is pivotally secured between the bifurcated arms of each bracket 34 by pin 37. Plate 36 is attached to the vertical side wall of foundation 2 bordering the depression 28 by suitable bolts. With this structure the cylinders 27 are free to pivot toward the center of the silo as the rod moves outwardly during the working stroke.

The action of cylinders 27 is controlled by a pair of limit switches 38 and 39. The switches are secured in a spaced relation to a bar 40 which is attached to foundation 2. Switches 38 and 39 are alternately actuated by the clamp 32 of one of the cylinders 27 to reverse the hydraulic pressure on the piston and cause the rod 29 to move reciprocally.

During the outward stroke of rod 29, clamp 32 contacts the outwardly extending arm of switch 38 actuating the same with the result that the flow of hydraulic fluid in cylinders 27 is reversed, thereby causing the rods 29 to be drawn inwardly and moving the pipe 15 in a clockwise direction. Near the end of the inward stroke of rod 29 clamp 32 actuates switch 39 again reversing the flow of hydraulic fluid in cylinders 27, causing rods 29 to move outwardly and rotating pipe 15 in a counterclockwise direction. The pipe is thus given an alternately clockwise and counterclockwise or oscillatory motion about its central axis.

The hydraulic system as applied to one of the cylinders 27 may be seen most clearly in Fig. 2. Switches 38 and 39, when contacted by clamp 32, actuate a solenoid valve 41 which controls the flow of fluid to cylinder 27. A line 42 connnects valve 41 with a pump 43 which is driven by motor 44, and a return line 45 connects valve 41 with oil reservoir 46. A supply line 47 connects pump 43 and reservoir 46. Two lines 48 and 49 extend from valve 41 to opposite ends of cylinder 27. The switches 38 and 39 actuate valve 41 to alternately allow hydraulic fluid under pressure from pump 43 to pass through lines 48 and 49 to alternately exert pressure on either side of the piston and thereby move piston rod 29 in a reciprocating manner.

Pump 43, motor 44 and reservoir 46 are disposed in an outwardly extending recess 50 which communicates with annular recess 16 and with one of the depressions 28. Recess 50 is covered by a closure plate 51.

Rotary movement of pipe 15 is transmitted to cutter arm 3 to drive the same by means of a plurality of hooks or teeth 52 which extend upwardly from fin 20 and successively engage a hinged latch 53 which is pivotally secured to arm 3 adjacent its outer end.

Hooks 52 are generally flat upstanding members which are attached at circularly spaced intervals to the upper edge of fin 20. The upper end of each hook is provided with a tapered tip which faces in the direction of rotation of cutter arm 3.

The upper end of latch 53 is pivotally secured between a pair of lugs 54 which are welded edgewise to the inner surface of the leading side wall of cutter arm body portion 5. Latch 53 extends downwardly from the position of pivotal attachment through a suitable slot in body 5 and terminates adjacent foundation 2 in a hook-like tip which faces away from the direction of movement of arm 3.

Latch 53 is disposed on the same radius in relation to silo 1 as hooks 52 so that the hooks 52 may successively engage latch 53 and move cutter arm 3.

As pipe 15 moves counterclockwise by the action of cylinders 27, one of the hooks 52 engages latch 53 and pushes arm 3 ahead of it. As the movement of pipe 15 is reversed the engaging hook moves clockwise out of contact with the latch 53 and a second preceding hook moves past latch 53, pivoting the same upward as it passes. After the second hook has moved clockwise beyond latch 53, the latch falls by its own weight into the vertical position in location to be engaged by the second hook as the movement of the pipe is reversed and the hooks again move counterclockwise.

This action is continued with the latch 53 being successively engaged by each of the hooks 52 to progressively drive arm 3 about the silo. It is desirable to space the hooks 52 about one foot apart on pipe 15, and with this spacing the pipe is given a rotary movement slightly in excess of one foot so that the latch 53 will successively engage and be driven by each hook. As the arm 3 pivots about shaft 7 and sweeps around the interior of the wall of the silo, the cutter chain moves independently about sprockets 11 and 14 to force the teeth 13 into the silage to cut the same. The cut silage is swept into trough 4 and conducted to the exterior of the silo by a suitable conveyor unit disposed within the trough.

The outer end of cutter arm 3 is supported by a roller 55 which is rotatably secured by a pin 56 within a transverse slot in the underside of cutter body 5. Roller 55 is adapted to ride on the upper surface of outer closure plate 18 as the cutter arm rotates within the silo.

In event of a power failure or other emergency, means is provided to manually move pipe 15 so that the gap 17 in the pipe may be aligned with the vertical center line of trough 4 and the central pedestal 9 with the pivot shaft 7 may be removed through the trough to the exterior of the silo. This means may take the form of a rack 57 secured to the underside of pipe 15 and having a plurality of teeth thereon which are adapted to be engaged by a gear 58. Gear 58 is secured to the end of a shaft 59 which is journaled within bearings 60. Bearings 60 are suitably secured to the underside of closure plate 51. Shaft 59 extends outwardly through the recess 50 to the exterior of the silo and the outer end thereof is provided with a handle 61. Rotation of handle 61 causes gear 58 to mesh with the teeth on rack 57 and rotates pipe 15. As the pipe 15 during oscillation moves only a little more than one foot in either direction, gap 17 can never be more than that distance from its aligned position with trough 4. In view of this, rack 57 need only be of a length sufficient to move the pipe this short distance.

The present invention provides a drive system for rotating a sweep cutter arm whereby the arm is driven by positive hydraulic pressure and the force thus attainable is considerably greater than the mechanical force attainable with a conventional centrally driven arm. This enables the cutter arm to move through the hardest packed silage without slowing down or creating dangerous torques at the pivot post.

The apparatus is of simple construction with a small number of moving parts so that installation and maintenance costs are minimized.

While the present drive system is particularly adaptable to large diameter silos having relatively longer cutter arms, the system may be employed with equal results in any size silo or storage vessel containing stored material to be undercut.

Various embodiments of the invention may be employed within the scope of the following claims.

I claim:

1. A drive system for a sweep cutter arm rotatably mounted at the center of a storage structure and adapted to rotate within said structure and undercut the stored material contained therein, which comprises a generally circular member disposed within said structure and spaced radially outwardly of the center of the structure and lying in a plane substantially parallel to and beneath the plane circumscribed by said rotating cutter arm, drive means disposed outwardly of the center of the structure to move said member about the central axis thereof, and means upstanding from said member and disposed in position to engage the outer portion of said cutter arm to drive said arm in a circular path as said member moves.

2. A drive system for a sweep cutter arm rotatably mounted on a shaft at the center of a storage vessel and adapted to rotate within said vessel and undercut the stored material contained therein, which comprises a generally circular member separate from the shaft and disposed within and concentrically of said vessel and lying in a plane substantially parallel to and beneath the plane circumscribed by said rotating cutter arm, drive means disposed radially outwardly of the shaft to rotate said member about the central axis thereof, engaging means upstanding from said member, and means depending from said cutter arm and disposed in position to be engaged by said engaging means to drive said arm in a circular path as said member is rotated.

3. A drive system for a sweep cutter arm rotatably mounted at the center of a storage vessel and adapted to rotate within said vessel and undercut the stored material contained therein, which comprises a generally circular member disposed within and concentrically of said vessel and lying in a plane substantially parallel to and beneath the plane circumscribed by said rotating cutter arm, said circular member having a radius slightly less than the length of the cutter arm to position said circular member beneath the outer end portion of the cutter arm, means depending from the outer portion of said cutter arm, a plurality of teeth extending upwardly at spaced intervals from said member and disposed in position to engage said means, and means to oscillate said member about its central axis with said teeth successively engaging said means as said member oscillates to drive said arm in a circular path.

4. A drive system for a sweep cutter arm rotatably mounted on a foundation at the center of a storage vessel and adapted to rotate within said vessel and undercut the stored material contained therein, which comprises a ring disposed in a recess formed in said foundation, said ring being concentric with said vessel and lying in a plane substantially parallel to and beneath the plane circumscribed by the rotating cutter arm, a plurality of hook members attached at spaced intervals to said ring and extending upwardly therefrom above the surface of said foundation, pivotal means associated with the outer portion of said cutter arm and adapted to be successively engaged by said hook members, and hydraulic means disposed within said recess for moving said ring in an oscillatory manner about its central axis, said pivotal means being engaged by one of said hook members as the ring is moved in one direction during oscillation thereof to drive said cutter arm in a circular path, and said pivotal means being pivoted upwardly by the next preceding hook member as the ring is moved in the opposite direction during oscillation thereof to enable said next preceding hook member to move into position to engage said pivotal means when said ring again moves in the first direction.

5. A drive system for a sweep cutter arm rotatably secured to a foundation at the center of a silo and adapted to rotate within said silo to undercut the stored material contained therein, which comprises a generally annular member disposed within and concentrically of said silo in a recess formed in said foundation, said member lying in a plane substantially parallel to and beneath the plane circumscribed by said rotating arm, a plurality of hook members attached at spaced intervals to said ring and extending upwardly therefrom above the surface of said foundation, pivotal means associated with the outer portion of said cutter arm and adapted to be engaged by said hook members, means to partially cover said recess to prevent silage from falling therein, means within said recess for supporting said member in oscillatory movement, and means for moving said member in oscillatory movement about its central axis with said hook members successively engaging said pivotal means as said member oscillates to drive said arm in a circular path.

6. A drive system for a sweep cutter arm rotatably secured to a foundation at the center of a silo and adapted to rotate within said silo to undercut the stored material contained therein, which comprises a ring member disposed within and concentrically of said silo in a recess formed in said foundation, said ring member lying in a plane substantially parallel to and beneath the plane circumscribed by said rotating arm, a pair of annular cover members disposed concentrically of said silo on the upper surface of said foundation, said members substantially covering said recess and being radially spaced to provide an annular clearance therebetween aligned above said ring member, a fin secured to said ring member and extending upwardly therefrom and within said clearance with the upper edge of said fin being substantially flush with the upper surface of said cover members to prevent silage from falling through said clearance into said recess, a plurality of hook members attached at spaced intervals to the upper edge of said fin and extending upwardly above said cover members, a pivotal member connected to the outer portion of said cutter arm, a drive system operatively connected to said ring member for oscillating said ring member about its central axis with said hook members successively engaging said pivotal member as said ring member oscillates to drive said arm in a circular path.

References Cited in the file of this patent

UNITED STATES PATENTS

| 1,275,558 | Holmgreen | Aug. 13, 1918 |
| 2,201,939 | Auger et al. | May 21, 1940 |

FOREIGN PATENTS

| 66,417 | Denmark | Mar. 8, 1948 |